Figure 4:
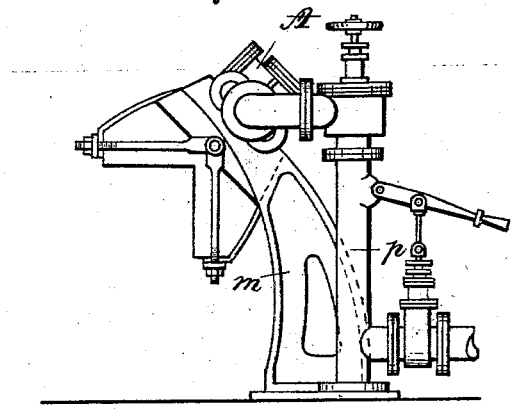

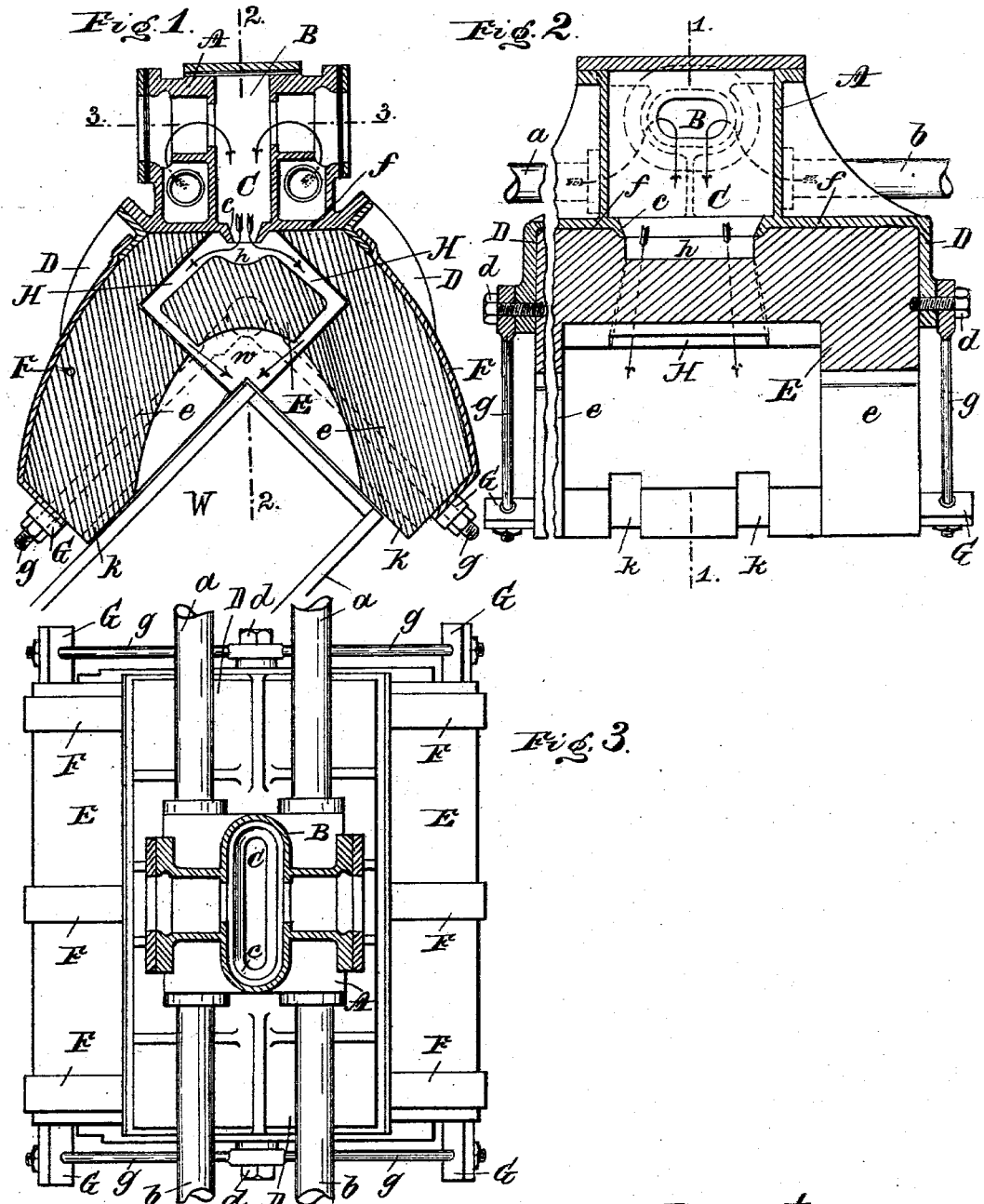

No. 753,375. PATENTED MAR. 1, 1904.
H. DICKE.
WELDING APPARATUS.
APPLICATION FILED APR. 12, 1901.
NO MODEL. 4 SHEETS—SHEET 2.

Witnesses:
Inventor:
Hugo Dicke,
By his attys,

No. 753,375. PATENTED MAR. 1, 1904.
H. DICKE.
WELDING APPARATUS.
APPLICATION FILED APR. 12, 1901.
NO MODEL. 4 SHEETS—SHEET 3.
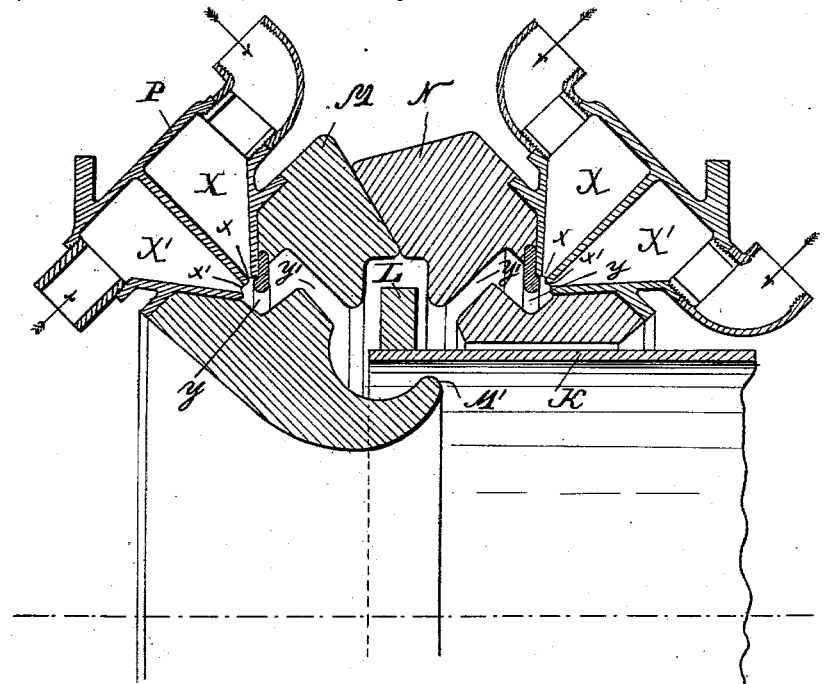
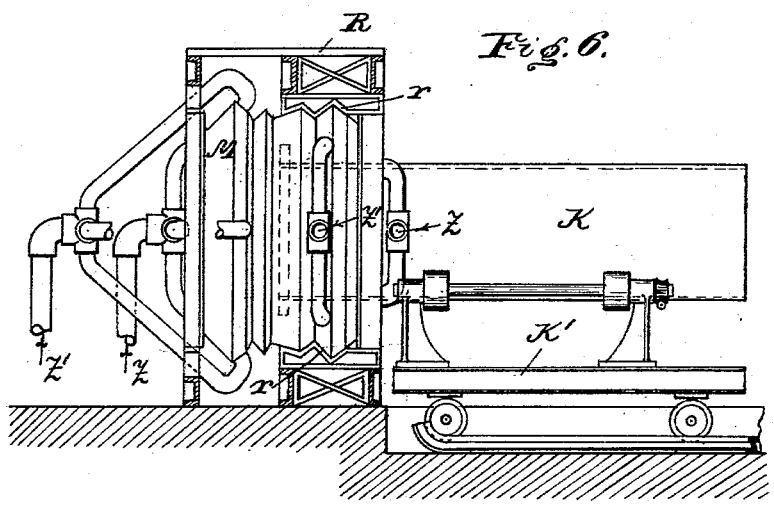
Witnesses:
Inventor
Hugo Dicke No. 753,375. PATENTED MAR. 1, 1904.
H. DICKE.
WELDING APPARATUS.
APPLICATION FILED APR. 12, 1901.
NO MODEL. 4 SHEETS—SHEET 4.

Witnesses:
A. E. Grant.
J. M. Wurm

Inventor:
Hugo Dicke
By his attys.
Pennie & Goldsborough

No. 753,375. Patented March 1, 1904.

UNITED STATES PATENT OFFICE.

HUGO DICKE, OF FRANKFORT-ON-THE-MAIN, GERMANY, ASSIGNOR TO JACOB EDUARD GOLDSCHMID, OF FRANKFORT-ON-THE-MAIN, GERMANY.

WELDING APPARATUS.

SPECIFICATION forming part of Letters Patent No. 753,375, dated March 1, 1904.

Application filed April 12, 1901. Serial No. 55,489. (No model.)

*To all whom it may concern:*

Be it known that I, HUGO DICKE, head engineer, residing at Neue Mainzerstrasse 14, Frankfort-on-the-Main, Germany, have invented new and useful Improvements in Welding Apparatus, (for which Letters Patent have been applied for in Germany, application G.15,082 I/49, of November 29, 1900; in Russia, application No. 12,683, of November 24, 1900; in England, provisional application No. 2,780, of February 8, 1901, and in Germany, application G.15,332 I/497, of February 7, 1901,) of which the following is a specification.

The present invention relates to an apparatus for use in heating and welding metal wherein the flame of water-gas or the like is applied for the purpose of locally heating a certain portion of the work with a view of welding parts of that portion.

The apparatus is intended especially for welding all kinds of work which can only be exposed to the heating agent from one side, such as the water-reservoirs of steam-boilers and the like. This apparatus is also specially adapted for welding flanges on the ends of tubes.

According to this invention one or several water-gas flames are directed in such a manner onto the required spot that the heat is concentrated on it, and as compared with coke-firing the degree of heat employed is easily controlled while the main metal parts of the apparatus itself are sufficiently protected against the effects of the heat, and the whole apparatus can be easily adapted to various conditions and brought to the place where the welding effect is to take place. For this purpose the apparatus consists of a chamber or headpiece into which water-gas and air-conduits pass and where the mixture of same takes place and a welding-chamber in immediate communication with the head. This welding-chamber is made of refractory material and inclosing a hollow space which is open at one side so as to admit the work to be welded, while at the other side the gas-inlet is provided. The refractory material, preferably in the form of blocks, is contained in a metal jacket or frame from which it can be easily removed when required. The work is introduced through the opening into the hollow space and so placed that it closes that space as much as possible. For this purpose the refractory blocks are so formed or arranged that their front surfaces fit closely to the work and around the portion which is to be welded. In this manner a closed chamber is formed round the part that is to be welded in which the flames exert their full energy. When necessary the said chamber may be composed of two separate or separable parts, which are fitted from opposite sides over or round the work, and so inclose it that only passages are left for the escape of the gases of combustion.

According to the accompanying drawings two examples of the apparatus are represented, each adapted for a special purpose—one for use in welding together of two iron plates of some length along an edge, a process which is often required in the manufacture of steam-chambers, the other for use in welding a flange onto the end of a tube.

Figure 5:
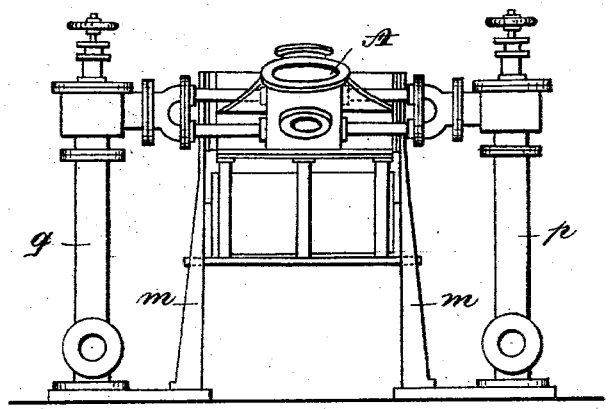
Figure 7:
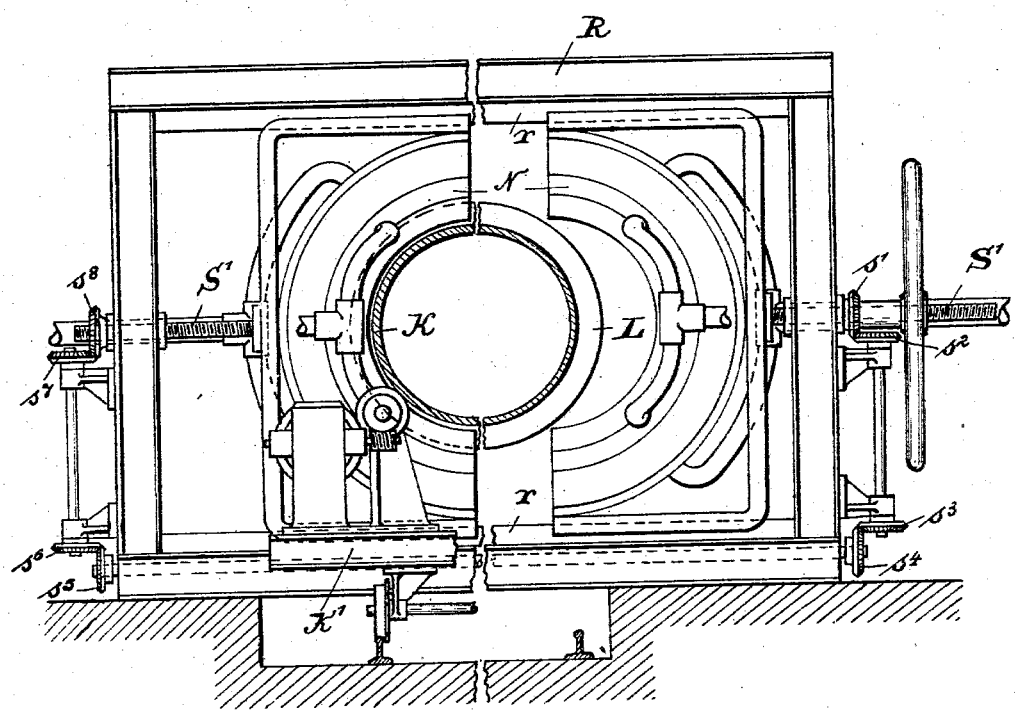

In the drawings, Figure 1 is a section on line 1 1 of Fig. 2 through an apparatus for welding plates at an angle. Fig. 2 is a section on line 2 2 of Fig. 1. Fig. 3 is a top view, partly in section, on line 3 3 of Fig. 1. Figs. 4 and 5 are two views representing the arrangement of the apparatus on a supporting-frame suitable for the kind of work for which it is intended. Figs. 6 and 7 are two views in elevation and end view, respectively, of an arrangement intended for welding flanges onto tubes, while Fig. 8 is a section through such apparatus on an enlarged scale.

The apparatus for welding rectangular chambers or angle plates, as represented in Figs. 1 to 5, will first be described. The headpiece A consists of a cast-iron body, suitably supported and provided with tubular connections $a$ and $b$ for a branched blast-tube. The gas entering the apparatus through these tubes is preliminarily mixed in a central chamber B and passes through a conduit C to the twyer or nozzle $c$. From the said head A project two lateral wings D, which may be provided with screws $d$, which penetrate slightly into corresponding recesses of the refractory material E, and thus fix the latter to the head A. The refractory material E or parts $e\ e$ composing it are also held in position by two plates connected with the head A, the plates being secured by means of a cross-bar G and screw-bolts $g\ g$, connected to the screws D, mentioned above, in such a manner that by screwing up the nuts on the bolts $g\ g$ the block E or the parts composing it are firmly pressed against the base-plates $f$ of the head A. The block according to the accompanying drawings is so formed that it will fit over the edge $w$ of the vessel W, its lower parts fitting closely against the walls of the vessel. The "gas-burner" proper is formed by passages H, which extend at one end from the twyer $c$, and are so curved or directed that two flames are projected against the part to be heated and welded. By appropriately forming the conduits H and their outlet any desired shape can be given to the flame. Where a straight welding-seam is required, conduits with a flat rectangular section will prove most suitable. In front of the twyer $c$ the conduits H are widened so as to form a small chamber $h$ with a concave depression in the block directly opposite the twyer-orifice against which the gas-mixture strikes and in consequence of which the mixture is made more perfect, while at the same time the twyer and the corresponding ends of the conduits are kept cool by the fresh quantities of the cold mixture arriving, so that no flame is formed here, but only at a point where the mixture leaves the conduit. The flames strike against the part to be welded and are reflected to the whole welding-chamber, thereby heating the parts of the block forming the walls, in consequence of which the radiating heat will greatly assist in heating the work. It should be observed here that grooves or conduits $k$ are provided on the surfaces which are in contact with the body of the work, through which conduits the combustion-gases escape. This apparatus may be variously arranged, according to whether the apparatus or the work can be more easily moved. For instance, it can be moved in the manner of, say, a hydraulic riveting-machine, or it may be fixed stationarily on a suitable support to which the work itself is moved. The working apparatus may be so arranged that the opening of the welding-chamber may be directed downward or upward.

Figs. 4 and 5 illustrate an arrangement in which the head A is supported by two lateral standards $m\ m$, arranged between the gas and air conduit pipes $p$ and $q$.

Figs. 6 to 8 represent a modified apparatus, in which K indicates a tube and L a flange to be welded onto it. The welding-chamber is made up of two rings of refractory material—namely, a stationary unbroken device or ring M and consists of one or more blocks rigidly connected together, and a ring N consisting of two or more parts which can be placed in position laterally, so as to allow the flange D to enter. Each of the rings M and N is provided with one or more burners. The iron ring-frame P, which surrounds the block M, is provided with, say, four burners, each of which is connected with the gas and air supply pipes. The air and the gas enter the chambers X X' of the burners and are propelled through obliquely-arranged twyers $x'$ in such a manner that the two currents strike against each other and become mixed. The mixture is then completed in a chamber $y$, from which a passage $y'$ leads to the space where the work is to be welded in such a manner that the mixture is forced to pass in a curved direction. The inner parts of the blocks M and N are so shaped that they practically surround the flange L and the part of the tube K in such a manner as to leave free space for the flame, while the flames from the conduits $y'$ strike exactly against the parts to be connected. The gases of combustion escape through passages N' and M'. The tube K is placed on a carriage K', on which it can be easily moved to the welding apparatus. The gas-conduit Z' and the air-conduit Z are each branched off into four pipes, each leading to one of the four burners. The parts of the separable ring N are held in frames R moving on guide-rails $r\ r$ and can be displaced forward and backward by means of screws S' S', connected by conical wheels and shafts $s'\ s^2\ s^3\ s^4\ s^5\ s^6\ s^7\ s^8$.

Now what I claim, and desire to secure by Letters Patent, is the following:

1. In an apparatus for locally heating metal for welding purposes, the combination of a head provided with air and gas conduits, walls of refractory material supported in said head, and constituting a heating-chamber, said walls enveloping and confining the parts to be heated, air and gas mixing conduits terminating in burner-orifices in said walls, and conduits between the article to be heated and the adjacent walls to direct the escaping products of combustion against the metal.

2. In an apparatus for locally heating metal for welding purposes, consisting of a head formed of a fixed and a movable portion provided with air and gas conduits, walls of refractory material supported in said portions and constituting a heating-chamber, said walls enveloping and confining the parts to be heated, air and gas mixing conduits terminating in orifices in said walls, and conduits formed in the walls adjacent to the articles to be heated to permit the escape of the products of combustion in proximity to the latter.

3. In an apparatus for locally heating metal for welding purposes, the combination of a head comprising a metal twyer with walls of refractory material supported thereby and constituting the heating-chamber, said walls having channels in connection with the twyer forming air and gas mixing conduits terminating in burner-orifices opening in said chamber, whereby the unignited gas is led from the twyer to said burner, substantially as described.

4. In an apparatus for locally heating metal for welding purposes, the combination of one fixed ring forming one half of a circular welding-chamber, a movable ring formed of two movable sections forming the other half of the welding-chamber, and air and gas conduits in the respective rings substantially as described.

5. In an apparatus for locally heating metal for welding purposes, the combination of a fixed ring forming one half of a circular welding-chamber, a second ring formed of two movable sections forming the other half of said chamber, air and gas conduits in the respective rings opening into said welding-chamber, a frame in which the sections of said second ring are slidably mounted, and mechanism for moving said sections in said frame to open and close said chamber.

6. In an apparatus for locally heating metal for welding purposes, the combination of a fixed ring forming one half of a circular welding-chamber, a second ring formed of two movable sections forming the other half of said chamber, air and gas conduits in the respective rings opening into said welding-chamber, a frame in which the sections of said second ring are slidably mounted, screw-shafts connecting the movable ring-sections to the frame, and gearing connecting said screw-shafts to simultaneously advance and retract said movable ring-sections.

In testimony whereof I have signed my name to this specification in the presence of two subscribing witnesses.

HUGO DICKE.

Witnesses:
RICHARD WIRTH,
ELISABETH HITZEROTH.